US011635037B1

(12) United States Patent
Lander et al.

(10) Patent No.: US 11,635,037 B1
(45) Date of Patent: Apr. 25, 2023

(54) METHODS AND SYSTEMS FOR DIAGNOSING ENGINE CYLINDERS

(71) Applicant: Transportation IP Holdings, LLC, Norwalk, CT (US)

(72) Inventors: Benedict Lander, Erie, PA (US); Jody Motichka, Kansas City, KS (US); David Schroeck, Lawrence Park, PA (US); John Schutt, Lawrence Park, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/450,036

(22) Filed: Oct. 5, 2021

(51) Int. Cl.
  *F02D 41/22* (2006.01)
  *F02D 41/00* (2006.01)
  *F02D 41/14* (2006.01)
  *G01M 15/09* (2006.01)

(52) U.S. Cl.
  CPC ......... *F02D 41/22* (2013.01); *F02D 41/0087* (2013.01); *F02D 41/1446* (2013.01); *F02D 41/1497* (2013.01); *F02D 41/1498* (2013.01); *G01M 15/09* (2013.01); *F02D 2200/024* (2013.01); *F02D 2200/0404* (2013.01); *F02D 2200/0406* (2013.01)

(58) Field of Classification Search
  CPC .. F02D 41/22; F02D 41/0087; F02D 41/1446; F02D 41/1497; F02D 41/1498; F02D 2200/024; F02D 2200/0404; F02D 2200/0406
  USPC .......................................... 123/481; 701/114
  See application file for complete search history.

(56) References Cited

U.S. PATENT DOCUMENTS

| 5,101,781 | A | * | 4/1992 | Wolfe | F02B 77/10 123/198 D |
| 5,235,954 | A | * | 8/1993 | Sverdlin | F02D 41/266 251/129.09 |
| 5,632,257 | A | * | 5/1997 | Machida | F02M 26/49 73/114.74 |
| 5,792,949 | A | * | 8/1998 | Hewelt | G01M 3/025 123/41.86 |
| 6,101,442 | A | * | 8/2000 | Lewandowski | F02D 41/221 73/114.79 |
| 6,240,772 | B1 | * | 6/2001 | Thomas | F01M 11/10 73/114.25 |
| 6,345,594 | B1 | * | 2/2002 | Orschek | F01P 11/16 123/41.15 |

(Continued)

FOREIGN PATENT DOCUMENTS

DE    102016009988 A1    9/2017

*Primary Examiner* — Sizo B Vilakazi
*Assistant Examiner* — Brian R Kirby
(74) *Attorney, Agent, or Firm* — McCoy Russell LLP

(57) ABSTRACT

Systems and methods are provided for diagnosing cylinders in an engine. In one example, the method may include selecting a cylinder of the engine for perturbation, and while maintaining a horsepower output of the engine, perturbing the cylinder. Responsive to the perturbation of the cylinder inducing a crankcase pressure difference greater than or equal to a threshold difference, a degradation condition of the cylinder may be indicated. In one example, the perturbation may include cutting fuel to the cylinder. In one example, an engine load may be redistributed among each of remaining cylinder of a plurality of cylinders of the engine to maintain the horsepower output of the engine.

20 Claims, 5 Drawing Sheets

(56) References Cited

U.S. PATENT DOCUMENTS

| | | | | |
|---|---|---|---|---|
| 6,434,476 B1* | 8/2002 | Zagone | F02M 26/49 701/115 |
| 6,520,140 B2* | 2/2003 | Dreymuller | F02D 17/04 123/198 F |
| 6,564,172 B1* | 5/2003 | Till | G01F 9/008 700/282 |
| 7,878,049 B2* | 2/2011 | Roal | G01M 15/09 73/114.37 |
| 7,954,363 B2* | 6/2011 | Friis-Knudsen | G01M 15/09 73/114.01 |
| 8,538,626 B2 | 9/2013 | Kumar et al. | |
| 8,984,930 B2 | 3/2015 | Worden et al. | |
| 9,447,745 B2* | 9/2016 | Worden | F02D 41/22 |
| 9,631,566 B1* | 4/2017 | Ge | F02D 35/023 |
| 10,100,770 B2* | 10/2018 | Dudar | F02D 41/22 |
| 10,221,797 B2* | 3/2019 | Hönl | G01M 99/008 |
| 10,774,756 B1* | 9/2020 | Dudar | G01M 15/08 |
| 10,837,376 B2* | 11/2020 | Pathan | F02D 41/401 |
| 2001/0021893 A1* | 9/2001 | Weisman, II | B60K 31/04 73/114.61 |
| 2003/0187553 A1* | 10/2003 | Dillen | F02D 29/02 701/19 |
| 2004/0055576 A1* | 3/2004 | McCarthy, Jr. | F02M 55/002 123/457 |
| 2005/0222749 A1* | 10/2005 | Daniel | F02B 75/22 701/114 |
| 2006/0095196 A1* | 5/2006 | Carr | G01M 15/044 701/111 |
| 2007/0173989 A1* | 7/2007 | Walker | B61L 15/0081 701/19 |
| 2011/0023852 A1* | 2/2011 | Yamashita | F01M 13/00 123/574 |
| 2011/0224861 A1* | 9/2011 | Nagakura | F02D 41/1497 701/31.4 |
| 2012/0279290 A1* | 11/2012 | Malone | G01M 3/26 73/114.16 |
| 2012/0298080 A1* | 11/2012 | Maier | F02D 41/187 123/572 |
| 2013/0073174 A1* | 3/2013 | Worden | F02D 41/22 73/114.16 |
| 2013/0073175 A1* | 3/2013 | Banerjee | B60W 20/50 701/99 |
| 2016/0138526 A1* | 5/2016 | Peters | F02D 41/221 123/568.2 |
| 2017/0292438 A1* | 10/2017 | Hedrick | F02B 37/007 |
| 2018/0371971 A1* | 12/2018 | Nakano | F02M 35/10222 |
| 2020/0378329 A1* | 12/2020 | Muto | F02D 41/1405 |

* cited by examiner

METHODS AND SYSTEMS FOR DIAGNOSING ENGINE CYLINDERS

TECHNICAL FIELD

Embodiments of the subject matter disclosed herein relate to methods and systems for diagnosing cylinders in an engine.

DISCUSSION OF ART

Engine components may degrade during operation. Degraded engine components may be detected by engine service, such as via diagnostic tests. The performance of a given diagnostic test may be impacted by its specificity, reliability, ease of implementation, and/or other factors. In one example, degraded engine components may be detected with a leak-down test wherein one or more cylinders of an engine are tested for their capacity to retain air by introducing compressed air into the one or more cylinders and measuring the percent leakage. Leakage in excess of a threshold may indicate one or more degraded components (including, but not limited to, the intake and/or exhaust valves, piston rings, head gaskets, cylinder heads, loose fasteners, and/or engine block) and may involve further inspection to accurately diagnose and repair the leak path(s), potentially resulting in misdiagnosis and/or overlooked leak path(s). It may be desirable to have methods and systems for diagnosing degraded cylinders that differ in function from diagnostic tests that are currently available.

BRIEF DESCRIPTION

In one embodiment, a method for diagnosing cylinders in an engine may include selecting a first cylinder of the engine for perturbation, and while maintaining a horsepower output of the engine, perturbing the first cylinder; and responsive to the perturbation of the first cylinder inducing a first crankcase pressure difference greater than or equal to a first threshold difference, indicating a first degradation condition of the first cylinder.

DETAILED DESCRIPTION

Figure 1:
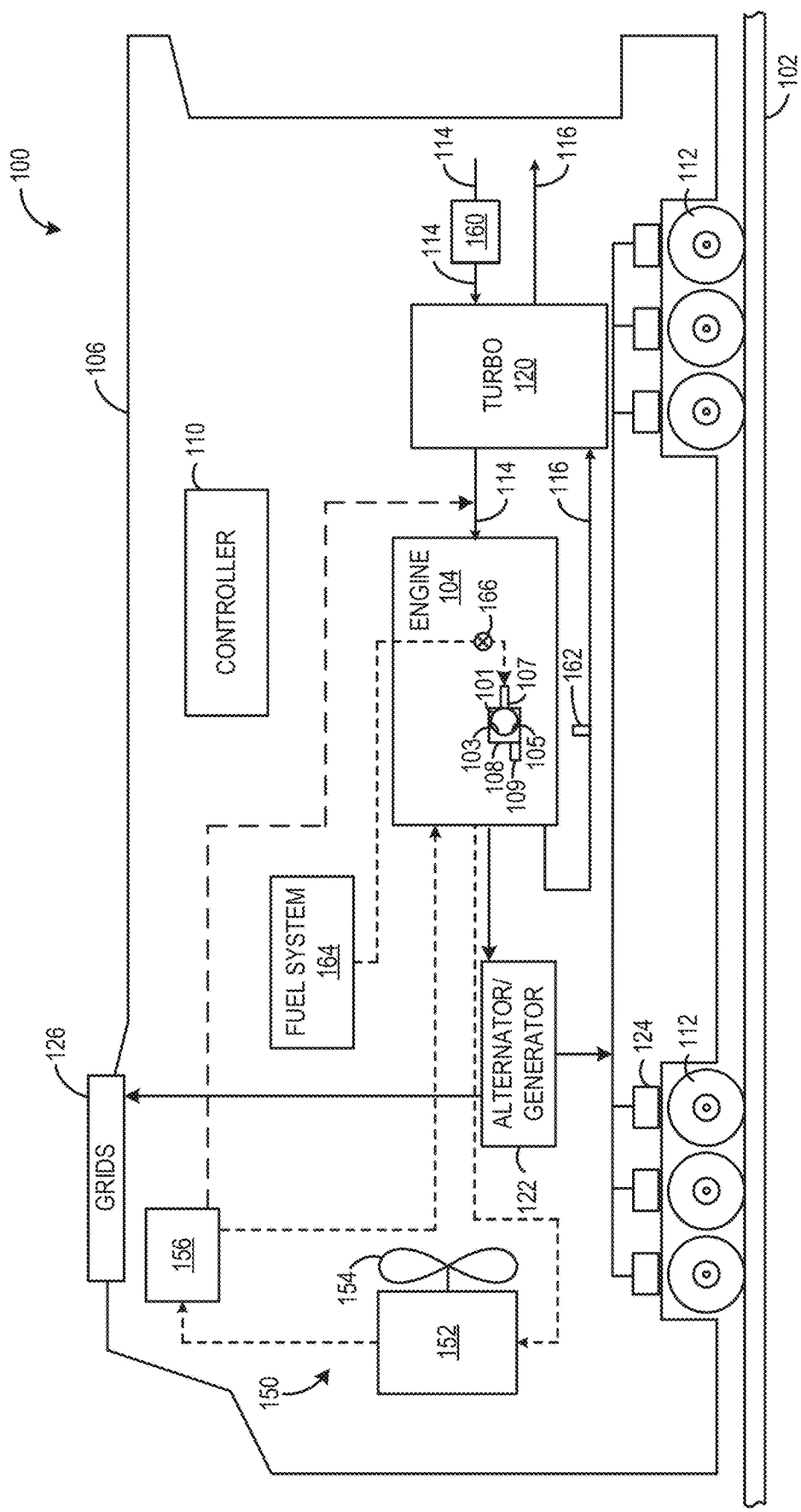
FIG. 1 shows a schematic diagram of a vehicle including an engine having a crankcase and a plurality of cylinders, according to an embodiment of the present disclosure.

Embodiments of the invention are disclosed in the following description, and may relate to systems and methods for diagnosing one or more degraded cylinders in an internal combustion engine system. Such an engine system may be positioned in a vehicle system. Suitable engine systems may include an engine with a crankcase retaining a plurality of cylinders. Aspects of the invention may reduce service-induced delay and errors related to diagnosing one or more degraded cylinders.

In examples where an engine system has lost power, cylinder leakage may be inferred. One approach to investigating cylinder leakage is to perform a leak-down test. In one example of a leak-down test, a single cylinder of an engine is tested in isolation, with a piston in the cylinder held at the top of a compression stroke and a corresponding crankshaft immobilized. The cylinder is fed compressed air and a pressure gauge reads pressure loss for a threshold duration (e.g., 20 minutes). The leak-down test may be repeated for each cylinder of the engine system and the resultant pressure loss for each cylinder may be compared to a threshold condition (e.g., greater than 30% pressure loss over 20 minutes indicates an anomaly). The test may be performed while the engine system is not running, such that additional observable engine operating parameters may be limited, and the test may be associated with long isolation times. Upon detection of pressure lost in excess of the threshold condition, additional diagnostics may be performed to identify the leak path(s). In an example, the leak-down test may rely on specialized knowledge of a performing technician who may use auditory cues via a stethoscope, cues such as bubbling or smoke color, or other indicators to narrow the diagnosis. In some cases, the leak-down test may result in misdiagnosis and resultant misallocated service. A method for diagnosing one or more degraded cylinders based on differences in crankcase pressure may mitigate some of the aforementioned challenges.

A technical effect of diagnosing cylinders based on differences in crankcase pressure is that anomalous engine performance may be characterized with greater specificity and accuracy. In one embodiment, a method for diagnosing one or more degraded cylinders may include selecting a target cylinder of an engine for perturbation and, while maintaining a horsepower output of the engine, perturbing the target cylinder. In an exemplary embodiment, the perturbation may include adjusting (e.g., cutting) fueling to the target cylinder. With the target cylinder perturbed, the crankcase pressure may be measured and compared to a pre-test crankcase pressure, with a crankcase pressure difference greater than a threshold difference (e.g., the crankcase pressure deviated by more than 10% from the pre-test crankcase pressure) indicating a degraded cylinder. In some examples, the method may be executed to identify and diagnose a single degraded cylinder. In other examples, the method may be executed to identify and diagnose multiple degraded cylinders. In an example where multiple cylinders may be diagnosed, the method may include testing each as described above, and if any cylinder has a crankcase pressure difference greater than or equal to a threshold, a defect of that cylinder may be indicated.

Measuring the crankcase pressure difference following cutting fuel to the target cylinder may isolate leak paths related to the target cylinder, a piston of the target cylinder, and/or piston rings of the target cylinder. In one example, a magnitude and/or a rate of change of the crankcase pressure difference for a leak in an intake or exhaust valve may not be the same as a leak in the crankcase. In an exemplary embodiment of the method, the method may include maintaining the horsepower output of the engine within a mid-load range. By executing the method within a defined range of one or more engine conditions, and maintaining the engine in such conditions, conditions for the diagnosis procedure may be systematically controlled.

FIG. 1 shows an embodiment of a vehicle system powered by an engine including a crankcase and a plurality of cylinders. Specifically, FIG. 1 shows a block diagram of an embodiment of a vehicle system 100. In the illustrated example, an engine 104 (e.g., an internal combustion engine, such as a high-speed diesel engine) is coupled to a vehicle of the vehicle system, which is depicted as a rail vehicle 106 (e.g., locomotive). The vehicle can run on a rail 102 via a plurality of wheels 112. As depicted, the vehicle may include the engine. The engine may include a crankcase 108. The crankcase is an enclosure for a crankshaft (not shown). The crankcase may be coupled to a cylinder block (not shown) at least partially housing a plurality of cylinders 101 (one representative cylinder shown in FIG. 1). In one embodiment, the plurality of cylinders may include a test cylinder for which fueling is adjusted during the diagnostic routines described in more detail in FIGS. 2-4. The test cylinder may be a target cylinder whereat the crankcase pressure is measured. In another example, the test cylinder may be a perturbation cylinder, which is separate from the target cylinder whereat the crankcase pressure is measured. Each of the one or more cylinders of the plurality of cylinders may be selected as the test cylinder in sequence. Accordingly, in an exemplary embodiment, fueling to each cylinder of the plurality of cylinders may be adjusted in sequence to diagnose each and every cylinder as degraded or non-degraded.

The crankcase may include a pressure sensor 109, which may monitor the internal pressure of the crankcase, and which may be communicably coupled to a controller 110 to provide monitoring data thereto. In other embodiments, there may be more than one crankcase pressure sensor. For example, there may be one crankcase pressure sensor for a single target cylinder which is removable (e.g., magnetized, removably fastened, adhered via a mild adhesive, or otherwise removable by hand) and may be placed on any other target cylinder. In certain examples, multiple removable crankcase pressure sensors may be included for simultaneously measuring the internal pressure of the crankcase at different target cylinders. For example, multiple sensors may be positioned at different locations along a crankshaft rotational axis to reduce certain oscillations in crankcase pressure that may be due to firing order, etc. In another example, there may be a permanently affixed (e.g., welded or otherwise removable via application of excessive force) crankcase pressure sensor mounted on the single target cylinder or on each cylinder or each cylinder bank. The cylinders each include at least one intake valve 103, exhaust valve 105, and fuel injector 107. Each intake valve, exhaust valve, and fuel injector may include an actuator that may be actuated via a signal from the controller of the engine. In one embodiment, the intake valve may engage and disengage an exhaust gas recirculation system (not shown). In other non-limiting embodiments, the engine may be in a stationary platform. Suitable stationary platforms may include a power-plant application. Other suitable vehicles may include a marine vessel, mining or industrial equipment, on-road vehicles, and off-highway vehicle propulsion systems.

The engine may receive intake air for combustion from an intake passage 114. The intake passage may include an air filter 160 that filters air received from outside of the vehicle. Exhaust gas resulting from combustion in the engine may be supplied to an exhaust passage 116. Exhaust gas may flow through the exhaust passage, and out of an exhaust stack of the rail vehicle. The exhaust passage may include an exhaust gas sensor 162, which may monitor a temperature and/or an air-fuel ratio of the exhaust gas, and which may be coupled to the controller to provide monitoring data thereto.

The engine system may include a fuel system 164 fluidically coupled to each of the plurality of cylinders. The controller may be communicably coupled to the fuel system. The fuel system may include a plurality of valves 166 respectively controlling fueling for the plurality of cylinders, each valve of the plurality of valves adjustable among a continuously variable set of positions. For example, a given valve may take on open, partially open, and closed positions. Fuel may flow through the valve when the valve is open or partially open. Fuel may not flow through the valve when the valve is closed. In one example, the engine may be a diesel engine that combusts air and diesel fuel through compression ignition. In another example, the engine may be a dual or multi-fuel engine that may combust a mixture of gaseous fuel and air upon injection of diesel fuel during compression of the air-gaseous fuel mixture. In other non-limiting embodiments, the engine may additionally combust fuel including gasoline, kerosene, natural gas, biodiesel, or other petroleum distillates of similar density through compression ignition (and/or spark ignition).

A suitable rail vehicle may be a diesel-electric locomotive. Suitable diesel-electric locomotives may include mainline haulers, heavy haul freight haulers, passenger rail vehicles, shunters, switchers, and the like. The diesel-electric locomotive may include other power sources, such as hybrid electric (batteries), fuel cells, hydrogen engines, and the like. While diesel is used as an example fuel, other fuels may be used. Suitable other fuels may include gasoline, kerosene, ethanol, biodiesel, natural gas, and combinations of the foregoing. As depicted in FIG. 1, the engine may be coupled to an electric power generation system, which includes an alternator/generator 122 and a plurality of electric traction motors 124. For example, the engine may be a diesel and/or natural gas engine that generates a torque output, which may be transmitted to the alternator/generator, the alternator/generator being mechanically coupled to the engine. In one embodiment herein, the engine may be a multi-fuel engine operating with diesel fuel and natural gas.

Electrical power produced by the alternator/generator may be stored and applied for subsequent propagation to a variety of downstream electrical components. As an example, the alternator/generator may be electrically coupled to the plurality of electric traction motors and the alternator/generator may provide electrical power to the plurality of electric traction motors. As depicted, each of the plurality of electric traction motors may be coupled to one of the plurality of wheels to provide tractive power to propel the rail vehicle. One example configuration may include one electric traction motor per wheel set (e.g., a subset of the plurality of wheels). As depicted herein, six electric traction motors may correspond to each of six pairs of motive wheels of the rail vehicle. In another example, the alternator/generator may be coupled to one or more resistive grids 126. The resistive grids may dissipate excess engine torque via heat produced by the grids from electricity generated by the alternator/generator. Additionally or alternatively, the resistive grids may be used in dynamic braking mode to dissipate electricity generated by the traction motors.

In some embodiments, the vehicle system may include a turbocharger 120 arranged between the intake passage and the exhaust passage. The turbocharger may increase air charge of ambient air drawn into the intake passage to provide greater charge density during combustion to increase power output and/or engine-operating efficiency. The turbocharger may include at least one compressor (not shown) which may be at least partially driven by at least one corresponding turbine (not shown). In some embodiments, the vehicle system may include an aftertreatment system coupled in the exhaust passage upstream and/or downstream of the turbocharger. In one embodiment, the aftertreatment system may include a diesel oxidation catalyst (DOC) and/or a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or exhaust aftertreatment systems.

As depicted in FIG. 1, the vehicle system may include a thermal management system 150 (e.g., engine cooling system). The thermal management system may circulate coolant (e.g., water, glycol, etc.) through the engine to absorb waste engine heat and distribute the heated coolant to a heat exchanger, such as a radiator 152 (e.g., radiator heat exchanger). A suitable coolant may be water. A fan 154 may be coupled to the radiator to maintain an airflow through the radiator when the vehicle is moving slowly or stopped while the engine is running. In some examples, a speed of the fan may be controlled by the controller. Coolant, which is cooled by the radiator, may enter a tank (not shown). The coolant may then be pumped by a water, or coolant, pump 156 back to the engine or to another component of the vehicle system.

The controller may control various components related to the vehicle. As an example, various components of the vehicle system may be coupled to the controller via a communication channel or data bus. In one example, the controller may include a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the rail vehicle (such as tractive motor load, blower speed, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the engine and/or the rail vehicle, may be configured to receive signals from a variety of engine sensors, as further elaborated herein, in order to determine operating parameters and operating conditions, and correspondingly adjust various engine actuators to control operation of the engine and/or the rail vehicle. For example, the controller may receive signals from various engine sensors including, but not limited to, crankcase pressure, engine speed, engine load, intake manifold air pressure, boost pressure, exhaust pressure, ambient pressure, ambient temperature, exhaust gas temperature, exhaust gas air-fuel ratio, particulate filter temperature, particulate filter backpressure, engine coolant pressure, or the like. Additional sensors, such as coolant temperature sensors, may be positioned in the cooling system. Correspondingly, the controller may control the engine and/or the rail vehicle by sending commands to various components such as the plurality of electric traction motors, the alternator/generator, the fuel injectors, valves, the coolant pump, or the like. For example, the controller may control the operation of a restrictive element (e.g., such as a valve) to admit or cut fuel from the fuel system to a given cylinder of the engine. Other actuators controllable by the controller may be coupled to various locations in the rail vehicle.

Figure 2:
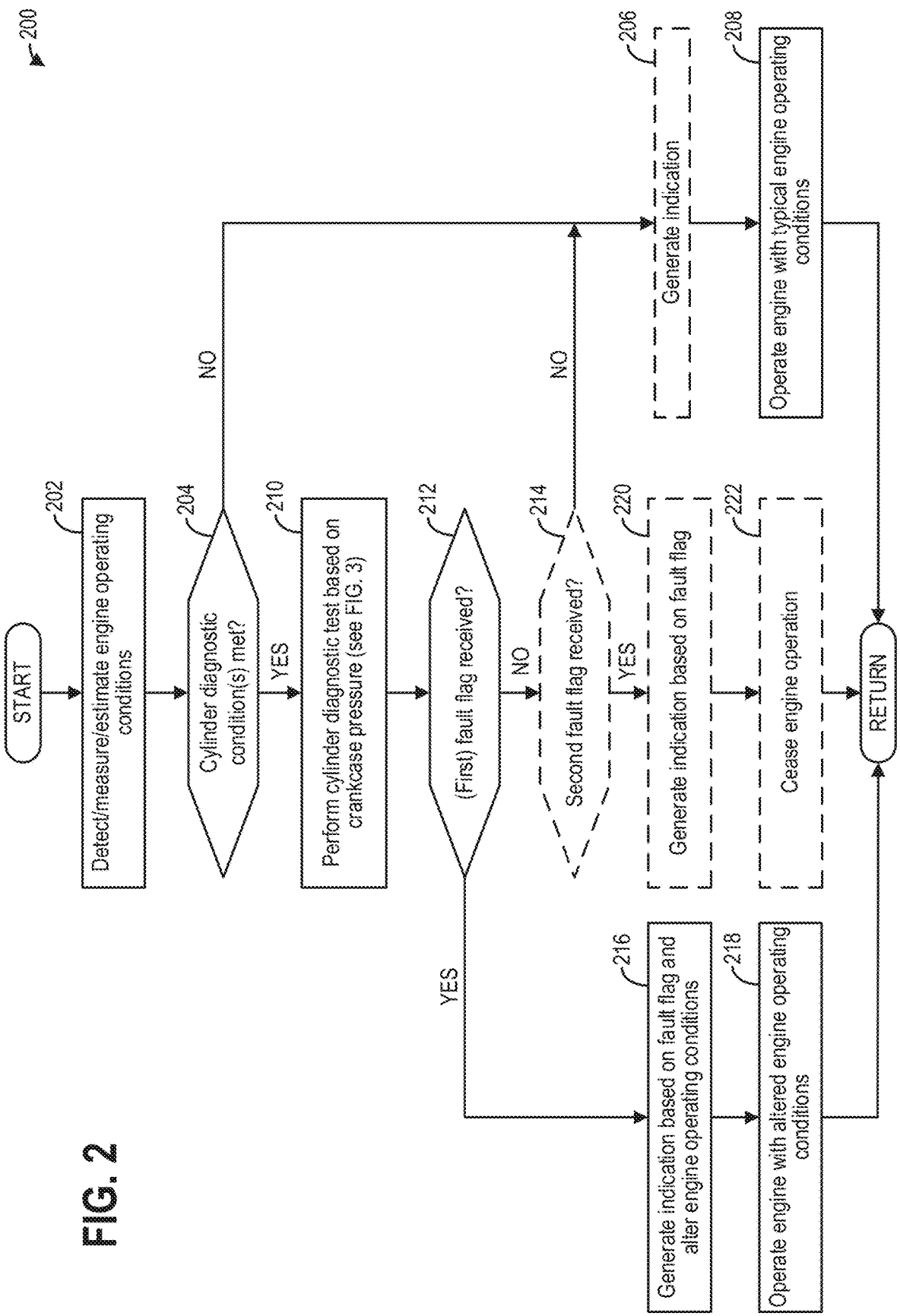
FIG. 2 shows a flow chart of a method for diagnosing one or more cylinders in an engine, according to an embodiment of the present disclosure.

Turning now to FIG. 2, a method 200 for diagnosing one or more cylinders in an engine is illustrated. In an exemplary embodiment, the method 200 may diagnosis the one or more cylinders based on a flag received from the method 300 described in detail below with reference to FIG. 3. Instructions for carrying out the methods described herein with reference to FIGS. 2 and 3 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. The methods described herein may be operated with the engine running.

At step 202, the method includes detecting, measuring, and/or estimating engine operating conditions. The engine operating conditions may include one or more of engine speed, engine load (e.g., a horsepower output of the engine), engine temperature, ambient conditions (e.g., ambient temperature, pressure, humidity, etc.), current operator torque demand, manifold pressure, crankcase pressure, manifold air flow, fuel temperature, etc. The engine operating conditions may be measured by one or more sensors communicatively coupled to the controller (e.g., crankcase pressure measured by the crankcase pressure sensor) or may be inferred based on available data (e.g., the engine temperature may be estimated from an engine coolant temperature measured by an engine coolant temperature sensor).

At step 204, the method includes determining whether one or more cylinder diagnostic conditions are met. The one or more cylinder diagnostic conditions may be stored on the controller of the system, and may each include an upper threshold and a lower threshold that describe mid-load engine operating conditions (e.g., throttle level or "notch," engine speed, horsepower output, engine airflow, manifold pressure, etc.). In one embodiment, a cylinder diagnostic condition may include selecting a mid-load throttle level (e.g., notch set to 3, 4, or 5, where notch 8 is a highest load throttle level) from a plurality of idle, low, mid, and high throttle levels (e.g., notch set to 0, 1, 3-5, and 6-8, respectively) of the engine corresponding to idle, low, mid, and high load horsepower output (e.g., 100, 800, 1200, and 1500 HP, respectively) to restrict the horsepower output to a mid-load horsepower output. In an exemplary embodiment, restricting the horsepower output to the mid-load horsepower output may include (actively) maintaining the horsepower output between an upper and lower threshold horsepower (e.g., 1200-2400 HP). A different threshold horsepower may be selected in other embodiments. In one embodiment, a cylinder diagnostic condition may include manifold air pressure being greater than an ambient pressure by at least a threshold amount (e.g., 20% above ambient) or between upper and lower threshold amounts (e.g., 15-25% above ambient). In one embodiment, a cylinder diagnostic condition may include a turbocharger being engaged. In one embodiment, a cylinder diagnostic condition may include an exhaust gas recirculation mode being disengaged. In one embodiment, a cylinder diagnostic condition may include an exhaust temperature being greater than a threshold warm-up temperature (e.g., 300° C.) and/or the engine having operated for at least a threshold warm-up duration (e.g., 3 minutes). In one embodiment, a cylinder diagnostic condition may include the controller receiving a request to initiate a cylinder diagnostic (e.g., from a technician or based on a predetermined cycle). The one or more cylinder diagnostic conditions may include any combination of one or more of the preceding cylinder diagnostic conditions and/or other parameters or conditions not expressly described herein. In one embodiment of the method, cylinder diagnostics performed while mid-load engine operating conditions are maintained may facilitate determination of distinctions between cylinders and may enable more accurate identification of an anomalous cylinder.

In response to the engine system operating without the cylinder diagnostic conditions met, the method may proceed to step 206. At step 206, the method includes generating an indication, such as an indication of inability to meet the one or more cylinder diagnostic conditions. In an example, an inability to meet the thresholds for various engine parameters may produce an inconclusive result and thus the cylinder diagnostic may not be initiated. In an example, an engine system may not generate enough horsepower to meet the one or more cylinder diagnostic conditions, and therefore a general diagnostic strategy may be more appropriate. In another example, a substantial decrease in horsepower output outside the threshold horsepower output may indicate a system-wide anomaly, such as an alternator or fuel injection malfunction, which may be specified in the indication. In some embodiments, no indication may be generated at step 206, and an absence of the indication may be inferred (e.g., by a technician or a vehicle operator) as the inability to meet the one or more cylinder diagnostic conditions. Accordingly, in FIG. 2, step 206 is indicated in dashing, as generating the indication may be optional. Additionally or alternatively, if the one or more cylinder diagnostic conditions are not met or following generation of the indication, the method may proceed to 208, where the engine may be operated with typical engine operating conditions.

Returning to step 204, in response to operating the engine system with the cylinder diagnostic conditions met, the method may proceed to step 210. At step 210, the method includes performing a cylinder diagnostic test based on crankcase pressure following the method described in detail below with reference to FIG. 3.

At step 212, the method includes determining whether a fault flag is received. If at least one fault flag is received at step 212, the method may continue to step 216. At 216, the method includes generating an indication that at least one cylinder is degraded and one or more engine operating conditions may be altered to account for the at least one degraded cylinders (e.g., to reduce or redistribute fueling, an engine load, an engine speed, etc. among the cylinders). The method may continue to step 218, where the engine may be operated with the one or more altered engine operating conditions. In one example, instructions may be given to operate the engine with the one or more altered engine operating conditions based on receipt of the at least one fault flag, such as operating with reduced or redistributed fueling, engine speed, and/or engine load to mitigate further degradation.

In some embodiments, there may be a single threshold that indicates the degraded cylinder(s), such that any cylinder test that generates a difference in excess of the threshold may result in generation of the one or more altered engine operating conditions. In other embodiments, different types of fault flags may be received by the controller. Fault flags and degradation conditions are described in more detail below with reference to FIG. 3.

As one example, one or more first fault flags indicative of a mild degradation condition or a cylinder-specific degradation condition may be received at step 212. If no first fault flags are received at step 212, the method may continue to step 214 to determine whether a second fault flag is received. For example, one or more second fault flags indicative of a severe degradation condition or a system-wide degradation condition may be received at step 214, where the severe degradation condition is greater in severity than the mild degradation condition. Accordingly, if at least one second fault flag is received, the method may continue to step 220 where an indication of the severe degradation condition may be generated with instructions to cease engine operation. In one example, the instructions to cease engine operation may include instructions to turn off the engine and replace a degraded part (e.g., a cracked piston ring). From step 220, the method may continue to step 222 where engine operation is ceased.

Returning to step 214, if no second fault flag is received, the method continues to step 206. At step 206, the method includes generating an indication of no cylinder or system degradation. In other embodiments wherein the fault flag does not classify a degradation condition based on severity or extent, the method may continue to 206 directly from a determination of no fault flags received at step 212. Accordingly, in FIG. 2, steps 214, 220, and 222 are indicated in dashing, as ceasing engine operation to avert a severe or system-wide degradation condition may not be executed absent differentiation among fault flags. In additional or alternative embodiments, no indication may be generated at 206, and an absence of the indication may be inferred (e.g., by a technician or a vehicle operator) as an absence of cylinder or system degradation. Accordingly, and as indicated above, in FIG. 2, step 206 is indicated in dashing, as generating the indication may be optional. From 206, the method may proceed to step 208, where the engine may be operated with typical engine operating conditions.

Figure 3:
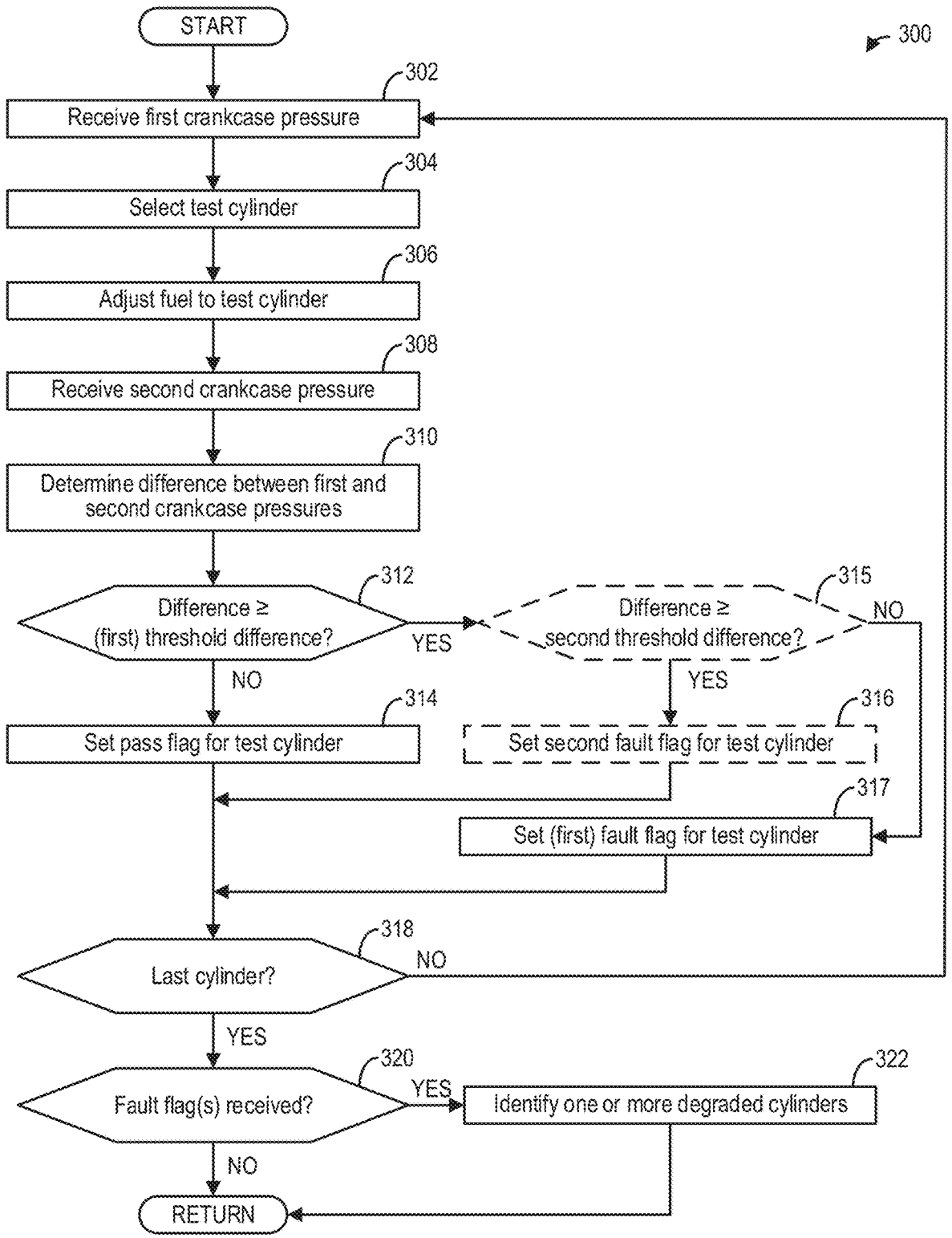
FIG. 3 shows a flow chart of a method for diagnosing one or more cylinders in an engine based on a difference in crankcase pressure following perturbation of the one or more cylinders, according to an embodiment of the present disclosure.

Referring now to FIG. 3, a method 300 for diagnosing one or more cylinders of an engine based on a difference in crankcase pressure is illustrated. In one embodiment, the method may include active perturbation of a test cylinder, for example by cutting fuel to the test cylinder, and passive perturbation of at least one cylinder of a plurality of remaining cylinders of the engine, for example by redistributing an engine load among one or more cylinders of the remaining cylinders while maintaining a mid-load engine horsepower output. Each cylinder of the engine may be tested following the method described below, or alternatively, one or a subset of cylinders of the engine may be tested. In one embodiment, one or more engine operating conditions may be monitored for a duration of the test. Maintaining the engine in mid-load operating conditions may allow efficient and targeted diagnosis of degraded cylinders and exclude otherwise complicating or interfering diagnostic possibilities. In one embodiment, the method of FIG. 3 may be executed as part of the method described in detail above at FIG. 2 (e.g., at 210).

At step 302, the method includes receiving a first (e.g., pre-test) crankcase pressure. In one embodiment, the pre-test crankcase pressure may be detected, measured, estimated, etc., e.g., via a crankcase pressure sensor, when each of the plurality of cylinders of the engine are fueled, for example, upon evaluation of one or more cylinder diagnostic conditions. An indication of the pre-test crankcase pressure may be stored in controller memory. In some embodiments, an engine may not include the crankcase pressure sensor during typical operation and the crankcase pressure may be monitored by a diagnosing technician with a manometer. In one embodiment, the pre-test crankcase pressure may be received cyclically. For example, in between cylinder tests (e.g., fuel cutouts), all cylinders of the engine may be fueled, and the engine ran for at least a threshold duration, e.g., one minute, during which the crankcase pressure may be measured and received as the pre-test crankcase pressure. In an example, the pre-test crankcase pressure may average −1.9 inches of water (inAq), e.g., 1.9 inAq less than atmospheric or ambient pressure, over 1 minute.

At step 304, the method includes selecting as a test cylinder for diagnosis. In one embodiment, the first cylinder may be a target cylinder whereat the crankcase pressure may be monitored. In another embodiment, a subset of target cylinders or a sequence of target cylinders may be selected prior to meeting the one or more cylinder diagnostic conditions in some examples or upon or following meeting the one or more cylinder diagnostic conditions in other examples. In one example, the cylinder test ordering may be preset at the controller, e.g., the first cylinder may be the first cylinder of a firing order. In another embodiment, a technician may select the order of diagnosis. In one embodiment, the cylinder test ordering may be random (e.g., selected at the controller according to a pseudorandom number generator). Additionally or alternatively, the first cylinder (or any target cylinder) may be pre-flagged (e.g., prior to the testing conditions being met) for degradation based on various conditions such as an age of the cylinder. In one embodiment, each target cylinder may be selected responsive to the one or more cylinder diagnostic conditions being met such as while the horsepower output is maintained.

At step 306, the method includes adjusting fueling to the first cylinder. In one embodiment, the adjustment may include cutting fuel to the first cylinder. In another embodiment, the adjustment may include reducing the fuel supplied to the first cylinder, e.g., by 50%. In an exemplary embodiment, fuel may be cut to a single cylinder at once and all remaining cylinders of the engine may remain fueled, with the engine load redistributed among the plurality of fueled cylinders to maintain the horsepower output of the engine. In an example 12-cylinder engine, fuel may be cut to the first cylinder and the load may be redistributed among the remaining 11 cylinders of the engine to maintain the mid-load horsepower output of the engine.

At step 308, the method includes receiving a second (cylinder test) crankcase pressure. In one embodiment, the engine may be ran for up to a threshold duration (e.g., 1 minute) with fueling cut to the target cylinder during which the cylinder test crankcase pressure may be received by the controller. In one example, the cylinder test crankcase pressure may be greater than the pre-test crankcase pressure, e.g., an average of −2.0 inAq over 1 minute.

At step 310, the method includes measuring a first crankcase pressure difference. The first crankcase pressure difference may be the difference between the first and second crankcase pressures received for the first cylinder. In one embodiment, each of the first and second crankcase pressures may be a negative value, and the absolute difference between the first and second crankcase pressures may be measured. In an example, the first crankcase pressure difference may be given as a percentage, e.g., the second cylinder test crankcase pressure may be 5% different from the first, pre-test crankcase pressure.

At step 312, the method includes comparing the first crankcase pressure difference to a threshold difference. In one embodiment of the method, the threshold difference may be a single threshold magnitude (e.g., 10% above pre-test). In an additional or alternative embodiment, the threshold difference may be a lower threshold bound and there may be no upper threshold bound. In other embodiments, diagnosis of the first cylinder may be determined by comparing the first crankcase pressure difference to two (e.g., upper and lower bound) threshold differences, with a first (lower) threshold difference being less than a second (upper) threshold difference. For example, a first threshold difference may be set at greater than or equal to 10% above the first, pre-test crankcase pressure, and a second threshold difference may be set at greater than or equal to 20% above the first, pre-test crankcase pressure. In some embodiments, the first and second threshold differences may indicate a severity or extent of a degradation condition of the first cylinder. For example, the first crankcase pressure difference being greater than or equal to the first threshold difference and less than the second threshold difference may indicate a first, mild degradation condition of the first cylinder, and the first crankcase pressure difference being greater than the first threshold difference and greater than or equal to the second threshold difference may indicate a second, more severe, degradation condition of the first cylinder or another component of the engine (or the second degradation condition may correspond to a system-wide degradation condition). If the first crankcase pressure difference is less than the threshold difference (e.g., less than 10%), the method may continue to 314 where a pass flag may be set for the first cylinder. In one example, the pass flag may be set for a cylinder with a cylinder test crankcase pressure difference of 5%.

For example, at step 312, it may be determined whether the first crankcase pressure difference is greater than the first threshold difference, and, if so, the method may continue to step 315. At 315, the method includes determining whether the first crankcase pressure difference is greater than or equal to the second threshold difference.

In an example, the first threshold difference may be 10%, the second threshold difference may be 20%, and the first crankcase pressure difference may be 11%. In such an example, the first crankcase pressure difference may be greater than the first threshold difference and less than the second threshold difference. Accordingly, the method may continue to step 317, where a first fault flag indicating the first degradation condition may be set for the first cylinder.

Returning to step 315, the method includes determining whether the cylinder test difference is greater than or equal to a second threshold difference. For example, the second threshold may be 20% and the cylinder test difference is 21%. In such an example, the cylinder test difference is greater than a second threshold difference. The method continues to step 316 where a second fault flag is set for the target cylinder.

In other embodiments wherein a single threshold difference is used, the fault flag may not classify a degradation condition based on severity or extent, and the method may continue to step 317 directly from a determination of the first crankcase pressure difference being greater than the threshold difference at step 312. Accordingly, in FIG. 3, steps 315 and 316 are indicated in dashing, as no upper bound threshold difference (e.g., the second threshold difference) may be implemented in some embodiments.

In one example, the threshold difference and a fault flag may be stored in controller memory, the fault flag including an indication of a location/identity of the degraded cylinder. Additionally or alternatively, more than one threshold difference may be included in controller memory (e.g., in embodiments where both steps 312 and 315 are included). In such an example, the fault flag may indicate the location/identity of the degraded cylinder and the degradation condition. In one embodiment, an indication of the first degradation condition may be indicated by the first fault flag (e.g., the cylinder test crankcase pressure may be 10% greater than the pre-test crankcase pressure). In one embodiment, the second degradation condition of the engine, which may be greater in relative severity than the first degradation condition of the first cylinder, may be indicated by the second fault flag (e.g., the cylinder test crankcase pressure may be 20% greater than the pre-test crankcase pressure). In an example, a scored piston ring may generate a crankcase pressure difference indicative of the first fault flag and a cracked piston ring may generate a crankcase pressure difference indicative of the second fault flag.

Upon diagnosis of the first cylinder, the method may continue to step 318. At step 318, the method includes determining whether the first cylinder is the last cylinder of the cylinder diagnostic test. If the first cylinder is not the last cylinder of the cylinder diagnostic test, the method may return to step 302 and the cylinder diagnostic test may continue for each second cylinder of all remaining cylinders of the engine to be tested (e.g., to diagnose each second cylinder based on a respective second crankcase pressure difference). If the first cylinder is the last cylinder of the cylinder diagnostic test, the method may continue to step 320 to determine whether any fault flag was received. If at least one fault flag was received, the method may continue to step 322, where the receipt of one or more fault flags may identify one or more degraded cylinders, respectively, and then the method may return, e.g., to the method described in detail above with reference to FIG. 2. If at step 320 no fault flags were received, the method may return, e.g., to the method described in detail above with reference to FIG. 2.

Figure 4:
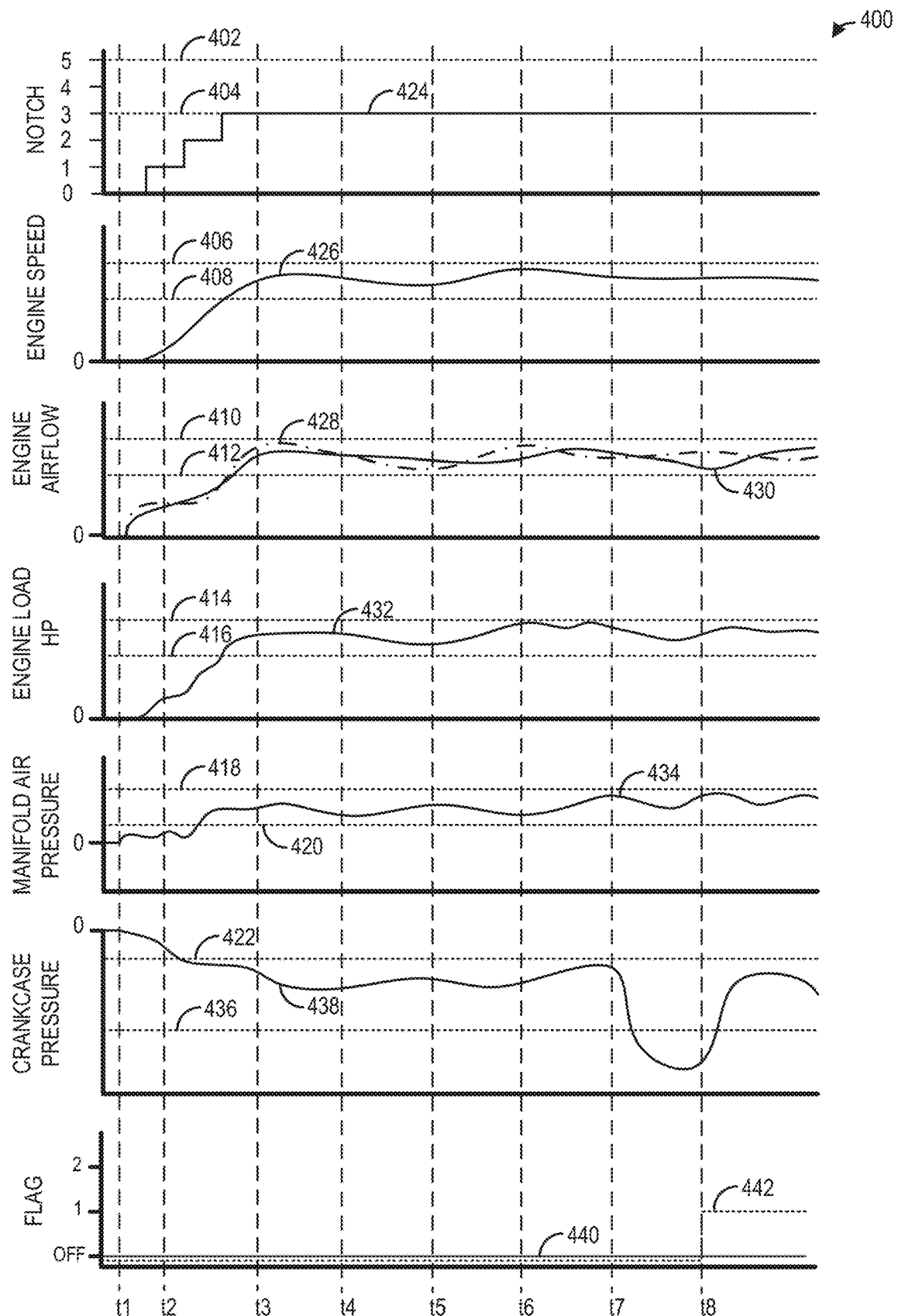
FIG. 4 shows a timing diagram for an example prophetic operation to diagnose one or more cylinders in an engine.

Referring now to FIG. 4, a timeline 400 is depicted showing an example prophetic operation to diagnose one or more cylinders in an engine, e.g., based on the methods of FIGS. 2-3. The horizontal axis (x-axis) denotes time and the vertical markers t1 through t8 identify reference times during the example prophetic operation. The following parameters are plotted as cylinder diagnostic conditions to be read by a controller of the engine during the example prophetic operation: throttle level or notch (solid line 424), engine speed (solid line 426), engine airflow (lines 428 and 430), engine load or horsepower output (solid line 432), manifold air pressure (solid line 434), and crankcase pressure (solid line 438). A parameter for flag indication is plotted for a first cylinder 440 and a second cylinder 442. The flag parameter is off until a crankcase pressure test occurs. Following the crankcase pressure test, a flag may be set for the cylinder. If no difference greater than a threshold difference is detected the flag may remain off. If a pressure difference greater than a first threshold is detected, a first flag condition may be set. If a pressure difference greater than a second threshold is detected, a second flag condition may be set.

In one embodiment, the cylinder diagnostic test described herein may be executed following verification of the cylinder diagnostic conditions within respective pairs of lower and upper thresholds. For example, dashed line 402 denotes an upper threshold notch (e.g., 5), dashed line 404 denotes a lower threshold notch (e.g., 3), and solid line 424 denotes the engine throttle level or notch received at the controller (e.g., from a memory of the controller or a vehicle operator). Notch numbering is arbitrary and other mid-load notches or numbering schemes could be used. Dashed line 406 denotes an upper threshold engine speed [e.g., 800 revolutions per minute (RPM)], dashed line 408 denotes a lower engine speed threshold (e.g., 500 RPM), and solid line 426 denotes the engine speed indicated in one embodiment by a crankshaft rotation sensor. Dashed line 410 denotes an upper threshold engine airflow [e.g., 600 cubic feet per minute (CFM)] and dashed line 412 denotes a lower threshold engine airflow (e.g., 300 CFM). In one embodiment, the dot-dash line 428 denotes engine airflow to a first cylinder bank and solid line 430 denotes engine airflow to a second cylinder bank, each engine airflow indicated in one embodiment by a respective airflow sensor. In one example, a cylinder diagnostic condition may include intake airflow to the first and second cylinder banks remaining substantially the same (e.g., within 5% of one another). Dashed line 414 denotes an upper threshold engine load [e.g., 1265 horsepower (HP)], dashed line 416 denotes a lower threshold engine load (e.g., 1215 HP), and solid line 432 denotes an engine load estimated in one embodiment by airflow sensor outputs and fuel injection readings. Dashed line 418 denotes an upper threshold manifold air pressure (e.g., 30% above ambient), dashed line 420 denotes a lower threshold manifold air pressure (e.g., 15% above ambient), and solid line 434 denotes a manifold air pressure estimated in one embodiment based on output from a manifold air pressure (MAP) sensor. Dashed line 422 denotes an upper threshold crankcase pressure (e.g., −1.6 inAq), dashed line 436 denotes a lower threshold crankcase pressure (e.g., −2.0 inAq), and solid line 438 denotes a crankcase pressure indicated in one embodiment by a crankcase pressure sensor. In some embodiments, the cylinder diagnostic conditions may allow a technician to quickly and easily determine distinctions between cylinders to efficiently and accurately identify a degraded cylinder.

Prior to t1, the engine speed is 0 while powered off. At t1, when the engine is powered on, the engine speed increases. Also at t1, engine load increases, manifold air pressure increases, and crankcase pressure decreases. Prior to a cylinder test, the first cylinder flag 440 and the second cylinder flag 442 are off.

At t2, the cylinder diagnostic test is initiated (e.g., by the controller or a technician). From t2 to t3, the engine operating conditions may be detected, estimated, or measured by the various sensors in the engine system and communicated to the controller. The cylinder diagnostic test may not proceed until the cylinder diagnostic conditions are met.

At t3, the notch is set to 3 and the engine load is between the lower and upper thresholds in a mid-load range (e.g., 1235 HP), indicating that the engine load is within a desired range for performing the diagnostic. Additionally, the engine speed is between the lower and upper threshold engine speeds (e.g., 700 RPM), indicating the engine speed is in the desired range for performing the cylinder diagnostic. In this example, intake airflow to the first and second cylinder banks are substantially similar (e.g., within ±5%) and within the lower and upper threshold engine airflows (e.g., 500 and 550 CFM). In this example, the manifold air pressure is between the upper and lower threshold manifold air pressures (e.g., +20% above ambient) and the crankcase pressure is between the upper and lower threshold crankcase pressures (e.g., −1.8 inAq). In one embodiment, the engine operating conditions may be monitored by the technician and, upon reaching the desired conditions, the technician may actuate an engine actuator (e.g., at a display interface or a mechanical actuator, such as a depressible button) to commence the cylinder diagnostic test. In another embodiment, the cylinder diagnostic test may begin automatically (e.g., via a command or set of commands from the controller) upon the cylinder diagnostic conditions having been met.

In response to the cylinder diagnostic conditions being met, at t4, a first pre-test crankcase pressure may be received. In one example, the first pre-test crankcase pressure is measured for a first threshold duration (e.g., 1 minute, such as between t4 and t5) and an average value may be determined (e.g., −1.8 inAq). While the first pre-test crankcase pressure is measured, the other cylinder diagnostic conditions may be monitored by the controller and/or the technician (e.g., at the display interface). In one example, for the duration of the first pre-test crankcase pressure measurement (from t4 until t5), all monitored engine parameters remain within the upper and lower limits therefor such that the mid-load engine condition is maintained.

At t5, a first cylinder of the test is actively perturbed. In an exemplary embodiment, the active perturbation includes adjusting (e.g., cutting) fuel to the first cylinder for a test duration (e.g., less than 1 minute). Also at t5, the remaining cylinders of the engine are passively perturbed by redistributing the engine load among the remaining cylinders while maintaining the mid-load engine horsepower. A first cylinder test crankcase pressure is received, e.g., upon being measured for and averaged across a second threshold duration (e.g., 1 minute, such as between t5 and t6). The engine load and the engine speed increase slightly (e.g., to 1240 HP and 725 RPM, respectively) and both parameters remain within the upper and lower thresholds. The first cylinder test crankcase pressure is found to be substantially similar to (e.g., within 10% of) the first pre-test cylinder pressure (e.g., the cylinder test crankcase pressure may be an average of −1.8 inAq over one minute). In this example, a difference between the first pre-test and the first cylinder test crankcase pressures is less than a first threshold difference (e.g., less than 10%) and a pass flag is set for the first cylinder. The first cylinder flag 440 remains off upon the completion of the test at t6.

At t6, the cylinder diagnostic test ceases for the first cylinder. The engine runs for a reset duration between fuel adjustments (e.g., at least 1 minute). The reset duration may be greater than the test duration in some examples. In one example, the crankcase pressure is monitored between fueling adjustments (e.g., during the reset duration) and the controller may receive a second pre-test crankcase pressure (e.g., measured over the first threshold duration). In one example, the engine parameters remain within the upper and lower limits for the duration between cutouts.

At t7, fueling to a second cylinder (different from the first cylinder) is cut for the test duration and the engine load is redistributed among the remaining cylinders of the engine while maintaining the mid-load engine horsepower. A second cylinder test crankcase pressure is measured for the second threshold duration. The engine load decreases slightly (e.g., 1235 HP) but remains within the mid-load upper and lower thresholds. From the t7 to t8, the engine speed remains within the upper and lower threshold engine speeds (e.g., 525 RPM). The manifold air pressure, the engine airflow, and the notch also remain within the upper and lower thresholds. The second cylinder test crankcase pressure is found to be significantly different from the second pre-test crankcase pressure (e.g., the second cylinder test crankcase pressure may be an average of −2.2 inAq over one minute). In this example, a pressure difference between the second pre-test and the second cylinder test is greater than a first threshold difference but less than a second threshold difference (e.g., between 10 and 20%). The second cylinder fault flag 442 may be set to 1 upon the completion of the test at t8, indicating a first degradation condition for the second cylinder.

At t8, the cylinder diagnostic test ceases for the second cylinder. In some examples, the cylinder diagnostic test may continue until all desired cylinders are tested. For a duration of the cylinder diagnostic test, a pass or fault flag may continue to be set for each test cylinders. The example timeline ends after testing a last cylinder of the desired cylinders to be tested. Following the cylinder diagnostic test, a summary indication may be issued specifying the results and engine operating conditions and/or engine operating conditions that may be altered. Additionally or alternatively, the degradation condition may indicated, e.g., the first degradation condition or a second, more severe, degradation condition. In an example, a cylinder diagnostic test of two cylinders that results in one fault flag at the first degradation condition may result in an indication including instructions to alter the engine operating conditions to manage the degraded cylinder (e.g., notch <6; engine speed <800 RPM). In an example, a cylinder diagnostic test of two cylinders that results in one fault flag at the first degradation condition and one fault flag at the second degradation condition may result in an indication including instructions to shut down the engine and service the degraded cylinder(s).

For the duration of the cylinder diagnostic test, the engine operating conditions may be monitored. In an example, if one or more of the engine operating conditions deviates from the mid-load engine condition, a summary indication may state the results of the cylinder diagnostic test are inconclusive. For example, if a significant decrease or increase in the engine load (e.g., outside of the mid-load range) is observed during a fuel cutout to a cylinder, additional or alternative diagnostics may be recommended.

Figure 5:
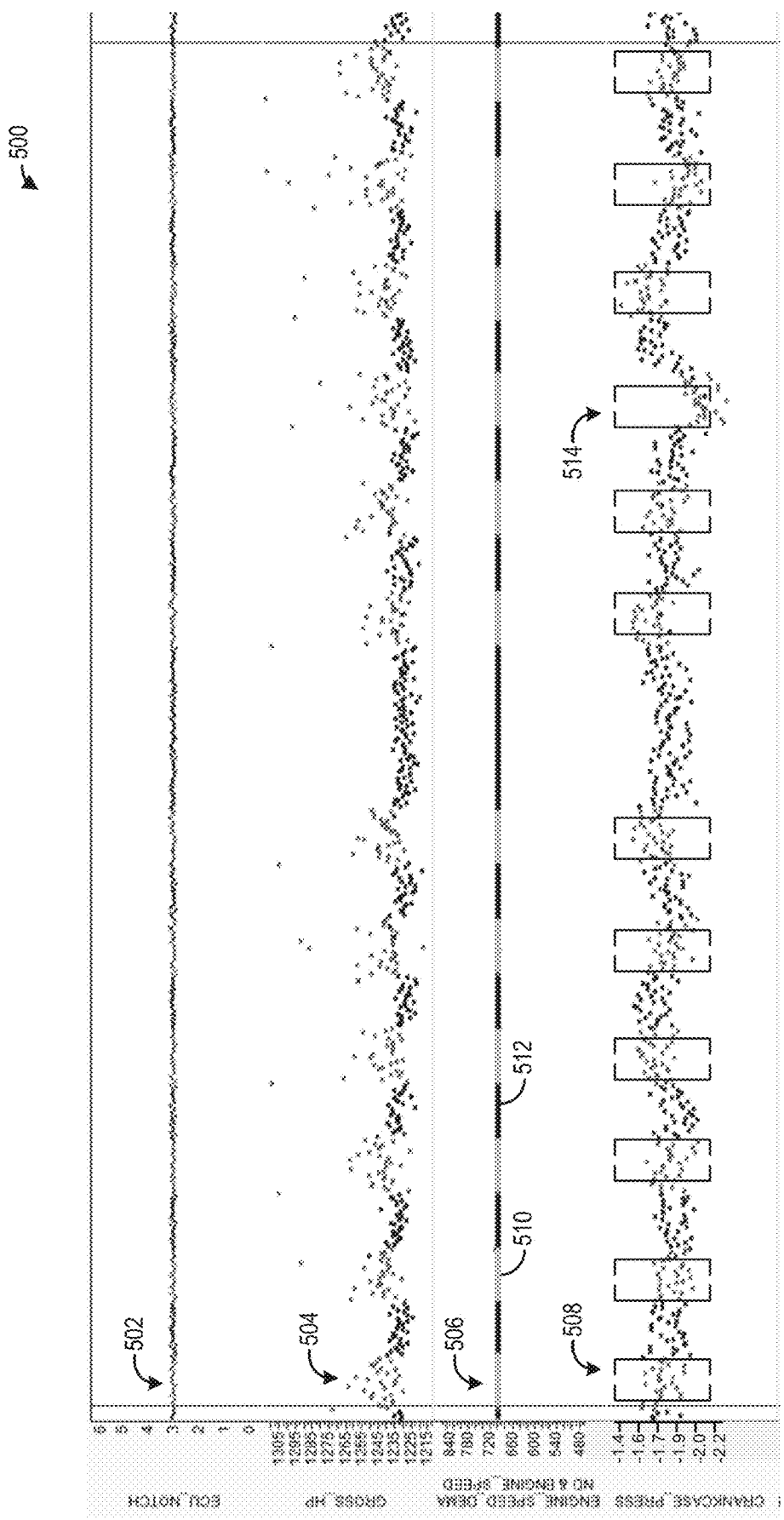
FIG. 5 shows a plot of crankcase pressure of an engine during an exemplary diagnostic operation.

Referring now to FIG. 5, a plot 500 of a crankcase pressure of an engine during an exemplary diagnostic operation is shown. In this example, engine operating conditions plotted include throttle level or notch 502, gross horsepower 504, engine speed 506, and crankcase pressure 508. As shown, the notch is set to three, the engine speed is 700 RPM, the gross horsepower ranges from 1215 to 1305 HP, and the crankcase pressure ranges from −1.4 to 2.3 inAq. Duration and reading of parameters during exemplary fuel cutouts to each specified cylinder are indicated in grey (e.g., 510). Duration and reading of parameters during exemplary fueling restoration is in black (e.g., 512). The fueling is cut out and restored cyclically until all twelve of the cylinders of the engine are individually tested. The crankcase pressure 508 reading during the fuel cutout for each cylinder is bracketed. The crankcase pressure and other operating conditions are monitored throughout the exemplary diagnostic operation. For eleven cylinders of the 12-cylinder engine, cutting fuel to the cylinder resulted in no anomalous change in the crankcase pressure (e.g., −1.9 inAq cylinder test average; −1.9 inAq pre-test average). Fuel cut to the ninth cylinder of the engine resulted in an anomalous crankcase pressure reduction (as shown in the figure by the arrow 514), indicating a degraded ninth cylinder (e.g., −2.2 inAq cylinder test average). In the plot, no significant changes to the other monitored operating conditions occur during the exemplary diagnostic operation of the ninth cylinder.

In this way, a method for diagnosing degraded cylinders based on differences in crankcase pressure may reduce service-induced delay and errors related to diagnostic procedures (e.g., misdiagnoses). For example, by comparing a pre-test crankcase pressure to a crankcase pressure during fuel a cutout to a target cylinder, components housed within the crankcase (e.g., piston rings, cylinder, etc.) may be selectively considered and components housed outside the crankcase (e.g., exhaust valves, intake valves, etc.) may be excluded from diagnostic consideration. Maintenance of a specified range of engine operating conditions (e.g., for a warmed, mid-load engine) throughout a duration of the test may enable a more accurate assessment of the health of other engine system components (e.g., fuel injection system, turbocharger, etc.) and therefore exclude those components from diagnostic consideration. Further, monitoring informative operating conditions while commanding active maintenance of the specified range of engine operating conditions may improve detection of system-wide anomalies, should they appear, that may additionally inform diagnosis. Overall, the service experience may be reduced in complexity, more accurate, and may reduce costs resulting from diagnostic imprecision and lengthy service time.

As used herein, an element or step recited in the singular and preceded with the word "a" or "an" should be understood as not excluding plural of said elements or steps, unless such exclusion is explicitly stated. Furthermore, references to "one embodiment" or "one example" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, the method comprising:
   selecting a first cylinder and a second cylinder of the engine for perturbation, the first cylinder in a first bank of the engine and the second cylinder in a second bank of the engine;
   while maintaining a horsepower output of the engine at a mid-load throttle level of the engine and while maintaining airflow to the first and second cylinder banks substantially the same:
   perturbing the first cylinder; and
   responsive to the perturbation of the first cylinder inducing a first crankcase pressure difference greater than or equal to a first threshold difference, indicating a first degradation condition of the first cylinder; and
   while continuing to maintain the horsepower output of the engine at the mid-load throttle level of the engine and while maintaining airflow to the first and second cylinder banks substantially the same:
   perturbing the second cylinder; and
   responsive to the perturbation of the second cylinder inducing another crankcase pressure difference greater than or equal to the first threshold difference, indicating another degradation condition of the first cylinder.

2. The method of claim 1, further comprising:
   for each second cylinder of a plurality of remaining cylinders of the engine, the plurality of remaining cylinders including all cylinders in the engine excepting the first cylinder:
   selecting the second cylinder of the engine for perturbation; and
   while continuing to maintain the horsepower output of the engine:
   perturbing the second cylinder; and
   responsive to the perturbation of the second cylinder inducing a second crankcase pressure difference greater than or equal to the first threshold difference, indicating a second degradation condition of the second cylinder.

3. The method of claim 1, wherein perturbing the first cylinder comprises:
   actively perturbing the first cylinder by cutting out fuel to the first cylinder; and
   responsive to the active perturbation of the first cylinder, passively perturbing each second cylinder of a plurality of remaining cylinders of the engine by redistributing an engine load among the plurality of remaining cylinders to maintain the horsepower output of the engine, wherein the plurality of remaining cylinders includes all cylinders in the engine excepting the first cylinder.

4. The method of claim 1, wherein the first degradation condition of the first cylinder is only indicated further responsive to the first crankcase pressure difference being less than a second threshold difference, the second threshold difference greater than the first threshold difference.

5. The method of claim 4, further comprising:
   further responsive to the perturbation of the first cylinder inducing the first crankcase pressure difference greater than or equal to the first threshold difference:
   responsive to the first crankcase pressure difference being less than the second threshold difference:
   altering one or more engine operating conditions based on the indication of the first degradation condition; and
   operating the engine with the one or more altered engine operating conditions; and responsive to the first crankcase pressure difference being greater than or equal to the second threshold difference:
indicating a second degradation condition of the engine; and
ceasing operation of the engine responsive to the indication of the second degradation condition.

6. The method of claim 1, wherein maintaining the horsepower output of the engine comprises:
selecting the mid-load throttle level of the engine from a plurality of throttle levels ranging from an idle or low-load throttle level to a high-load throttle level, the mid-load throttle level corresponding to a mid-load horsepower output of the engine, the idle or low-load throttle level corresponding to an idle or low-load horsepower output of the engine less than the mid-load horsepower output, and the high-load throttle level corresponding to a high-load horsepower output of the engine greater than the mid-load horsepower output; and
operating the engine at the mid-load throttle level to maintain the horsepower output within a horsepower output range, the horsepower output range including the mid-load horsepower output.

7. The method of claim 6, wherein the horsepower output range is a range within ±3.4% of the mid-load horsepower output.

8. The method of claim 6, wherein the mid-load horsepower output is between 1200-2400 hp.

9. A method for an engine having a first cylinder bank and a second cylinder bank, the banks together having a plurality of cylinders, the method comprising:
testing each cylinder of the plurality of cylinders of the first cylinder bank and the second cylinder bank while maintaining airflow to the first and second cylinder banks substantially the same, including for each test cylinder:
while maintaining operation of the engine within a mid-load notch engine load range and monitoring a crankcase pressure, adjusting fueling to at least one cylinder of the plurality of cylinders to increase a load on each of a plurality of remaining cylinders, the plurality of remaining cylinders including all cylinders in the plurality of cylinders excepting the at least one cylinder for which fueling is adjusted; and
responsive to the crankcase pressure increasing by greater than or equal to a threshold magnitude, indicating degradation of the test cylinder.

10. The method of claim 9, further comprising initiating operation of the engine within the mid-load notch engine load range responsive to one or more cylinder diagnostic conditions being met, the one or more cylinder diagnostic conditions comprising each of:
a manifold air pressure being greater than an ambient pressure by at least a first threshold amount,
a turbocharger being engaged,
an intake air flow from the turbocharger to one of a plurality of the first and second cylinder banks among which the plurality of cylinders is distributed being within a second threshold amount of each of a plurality of intake air flows from the turbocharger to each other of the first and second cylinder banks, respectively,
an exhaust temperature being greater than a threshold warm-up temperature,
the engine having operated for at least a threshold warm-up duration, and
an exhaust gas recirculation mode being disengaged.

11. The method of claim 9, wherein the mid-load notch engine load range does not include a first engine load during idle operation of the engine and a second engine load during rated operation of the engine.

12. The method of claim 9, wherein adjusting fueling to the at least one cylinder comprises cutting out fueling to the test cylinder for no more than a threshold duration, and wherein each cylinder of each bank is tested one after the other, each test separated by a restoration period of operation with all cylinders operating, the horsepower, mod-load notch, and airflow maintained throughout the threshold duration and restoration.

13. The method of claim 12, further comprising, following cutting out fueling to the test cylinder, maintaining fueling to each of the plurality of cylinders for greater than the threshold duration during the restoration period.

14. The method of claim 12, wherein the threshold duration is 1 min.

15. A vehicle system, comprising:
a first bank of cylinders and a second bank of cylinders forming a plurality of cylinders comprising a test cylinder;
a fuel system fluidically coupled to each of the plurality of cylinders;
a crankcase coupled to each of the plurality of cylinders;
a pressure sensor coupled to the crankcase; and
a controller communicably coupled to each of the fuel system and the pressure sensor, the controller executing instructions stored in non-transitory memory to, while maintaining horsepower via restricting an engine load of the vehicle system to a mid-load and maintaining airflow to the first and second banks substantially the same, and for each of the plurality of cylinders:
receive a first output from the pressure sensor prior to adjusting fueling to the test cylinder of the plurality of cylinders, the first output indicating a first crankcase pressure with all cylinders operating;
adjust fueling from the fuel system to the test cylinder;
receive a second output from the pressure sensor following adjusting fueling from the fuel system to the test cylinder, the second output indicating a second crankcase pressure;
determine a difference between the first and second crankcase pressures; and
responsive to the difference being greater than a threshold difference, indicate degradation of at least one cylinder of the plurality of cylinders, wherein operation alternates between all cylinders operating and with the test cylinder fueling adjusted, yet with horsepower maintained and airflow to the cylinder banks maintained substantially the same, and further with engine speed maintained substantially constant throughout said operation.

16. The vehicle system of claim 15, wherein the fuel system comprises a plurality of valves respectively admitting fuel to the plurality of cylinders,
wherein the controller is communicably coupled to each of the plurality of valves, and
wherein adjusting fueling from the fuel system to the test cylinder comprises closing a valve of the plurality of valves which admits fuel to the test cylinder.

17. The vehicle system of claim 15, wherein each of the first and second crankcase pressures corresponds to a pressure of at least a portion of the crankcase housing a crankshaft coupled to the test cylinder, and wherein indicating degradation of at least one cylinder of the plurality of cylinders comprises indicating degradation of the test cylinder.

18. The vehicle system of claim 15, wherein the plurality of cylinders further comprises a target cylinder which is not the test cylinder,
   wherein each of the first and second crankcase pressures corresponds to a pressure of at least a portion of the crankcase housing a crankshaft coupled to the target cylinder, and
   wherein indicating degradation of at least one cylinder of the plurality of cylinders comprises indicating degradation of the target cylinder.

19. The vehicle system of claim 15, wherein the instructions are further executable to receive a throttle level of the vehicle system,
   wherein the throttle level is neither a lowest throttle level of the vehicle system nor a highest throttle level of the vehicle system, and
   wherein the engine load is restricted according to the throttle level.

20. The vehicle system of claim 15, wherein the vehicle system is a rail vehicle.

\* \* \* \* \*